United States Patent
Chen et al.

(10) Patent No.: US 6,492,468 B1
(45) Date of Patent: Dec. 10, 2002

(54) VINYLCYCLOHEXANE-BASED BLOCK COPOLYMERS

(75) Inventors: Yun Chen, Krefeld (DE); Friedrich-Karl Bruder, Krefeld (DE); Volker Wege, Neuss-Rosellen (DE); Konstadinos Douzinas, Köln (DE); Ralf Dujardin, Willich (DE)

(73) Assignees: Bayer Aktiengesellschaft, Leverkusen (DE); Teijin Ltd., Osaka (JP)

(*) Notice: Subject to any disclaimer, the term of this patent is extended or adjusted under 35 U.S.C. 154(b) by 0 days.

(21) Appl. No.: 09/856,521

(22) PCT Filed: Nov. 16, 1999

(86) PCT No.: PCT/EP99/08793

§ 371 (c)(1),
(2), (4) Date: May 22, 2001

(87) PCT Pub. No.: WO00/32646

PCT Pub. Date: Jun. 8, 2000

(30) Foreign Application Priority Data

Nov. 28, 1998 (DE) .......................... 198 55 062

(51) Int. Cl.$^7$ .......................... C08F 8/42; C08F 212/08
(52) U.S. Cl. .......................... 525/338; 525/89; 525/91; 525/333.3; 526/308
(58) Field of Search .......................... 525/338, 89, 91, 525/333.3; 526/308

(56) References Cited

U.S. PATENT DOCUMENTS

| | | | |
|---|---|---|---|
| 4,911,966 A | 3/1990 | Murayama et al. | 428/64 |
| 4,997,898 A | 3/1991 | Ishihara et al. | 526/308 |
| 5,162,278 A | 11/1992 | Razavi | 502/152 |
| 5,223,468 A | 6/1993 | Razavi | 502/152 |
| 5,243,002 A | 9/1993 | Razavi | 526/170 |
| 5,278,265 A | 1/1994 | Razavi | 526/170 |
| 5,292,838 A | 3/1994 | Razavi | 526/160 |
| 5,352,744 A | 10/1994 | Bates et al. | 525/339 |
| 5,612,422 A | 3/1997 | Hucul et al. | 525/338 |
| 5,654,253 A | 8/1997 | Hucul et al. | 502/240 |
| 5,700,878 A | 12/1997 | Hucul et al. | 525/333.3 |
| 6,329,459 B1 * | 12/2001 | Kang et al. | 524/505 |

FOREIGN PATENT DOCUMENTS

| | | |
|---|---|---|
| GB | 1156932 | 7/1969 |
| JP | 10-116442 | 5/1998 |

OTHER PUBLICATIONS

Polymer Preprints (month unavailable) 1972, 3(1) pp. 427–432, J.F. Pendleton and D.F. Hoeg, Novel Heat Resistant Plastics from Hydrogenation of Styrene Polymers.
Advan. Chem. Ser. (month unavailable) 1973, No. 129, pp. 27–38, J.F. Pendleton, D.F. Hoeg and E.P Goldberg, Novel Heat Resistant Plastics from Hydrogenation of Styrene Polymers.
**Database WPI, Section Ch, Wek 198122, Derwent Publications Ltd., London, GB; AN 1981–39131D, XP002134294, & JP 56 038338 A (Asahi Chem. Ind. Co. Ltd.) Apr. 13, 1981.
**Database WPI, Section Ch, Week 199139, Derwent Publications Ltd., London, GB; AN 1991–284775 XP002134295, & JP 03 188114 A (Kuraray Co. Ltd.) Aug. 16, 1991.
**Sierra C.S. et al: Thermal and Mechanical properties of poly–(styrene–b–ethylene–co–butylene–b–styrene) triblock copolymers: Polymer, GB Elsevier Science Publisher B.V. Bd. 38, Nr. 17, Aug. 1, 1997, pp. 4325–4335, XP004083082.
**Storey R.F. et al: "Morphology and physical properties of poly(styrene–b–isobutylene–b–st yrene) Block copolymers" Polymer, GB Elsevier Science Publisher, B.V. Bd 37, Nr. 14, Jan. 1, 1996, pp. 2925–2938, XP004069281.

* cited by examiner

Primary Examiner—James J. Seidleck
Assistant Examiner—Olga Asinovsky
(74) Attorney, Agent, or Firm—Joseph C. Gil; James R. Franks; Aron Preis

(57) ABSTRACT

The present invention relates to block copolymers which are predominantly based on vinylcyclohexane and to a process for producing them. The block copolymers can be processed to form mouldings by extrusion or injection moulding. The mouldings which result therefrom are distinguished by their high resistance to thermal deformation, good mechanical properties, high transparency in the visible and near UV range, and by their particularly low birefringence and water absorption.

13 Claims, No Drawings

VINYLCYCLOHEXANE-BASED BLOCK COPOLYMERS

FIELD OF THE INVENTION

The present invention relates to block copolymers which are predominantly based on vinylcyclohexane and to a process for producing them. The block copolymers can be processed to form mouldings by extrusion or injection moulding. The mouldings which result therefrom are distinguished by their high resistance to thermal deformation, good mechanical properties, high transparency in the visible and near UV range, and by their particularly low birefringence and water absorption.

BACKGROUND OF THE INVENTION

Hydrogenated polystyrene (polyvinylcyclohexane) was described for the first time by Hermann Staudinger in 1929. This material exhibits very low birefringence, very low water absorption and satisfactory resistance to thermal deformation, and is particularly suitable as a substrate material for optical data storage media. U.S. Pat. No. 4,911,966 describes the use of the hydrogenation product of polystyrene as a substrate material for optical disks. Processes which result in hydrogenated polystyrenes of different microstructures, and in which special catalysts are used, are in described in WO 94/21694 and U.S. Pat. No. 5,352,744. Processes are known for the hydrogenation of atactic polystyrene to form atactic hydrogenated polystyrene by the use of special catalysts (EP-A 0 322 731, EP-A 0 423 100, U.S. Pat. No. 5,654,253; U.S. Pat. No. 5,612,422; WO 96/34896).

WO 94/21694 describes a process for the complete hydrogenation of aromatic alkenyl polymers and aromatic polyalkenyl/polydiene block copolymers by heterogeneous catalysis.

Completely hydrogenated block copolymers formed from styrene derivatives and conjugated dienes with a di- and triblock structure are also known. Compared with hydrogenated polystyrene, completely saturated block copolymers of this type on the one hand exhibit improved mechanical properties (increased impact strength and elongation at break), but on the other hand exhibit lower levels of transparency and a lower resistance to thermal deformation.

Partially or completely hydrogenated diblock and triblock copolymers have been described which are based on monomers of styrenes and conjugated dienes (represented by the symbols SB, SI, SBS or SIS, wherein S, B and I represent styrene, butadiene and isoprene, respectively) and which comprise a uniform block component (a "pure block"), and mixed diblock copolymers have been described (represented by the symbols $SB^M$ and $S^1M$) which comprise a soft block which consists of diene and styrene (JP 10 116 442-A, GB 1 156 932, Polymer Preprints (1972), 13(1), 427–432; Advan. Chem. Ser. (1973) No. 129, 27–38).

Compared with polyvinylcyclohexane, the block copolymers which are described there and which have a vinylcyclohexane content of at least 70% exhibit an increased elongation at break, and are described as rigid and transparent. However, the quoted optical transmission data (75–82%) indicate a level of haze which is quite high.

EP-A 505 110 describes blend systems comprising hydrogenated block copolymers of styrene, of a conjugated diene and of hydrogenated polystyrene, wherein the olefinic double bonds are completely hydrogenated and the aromatic bonds are 60–80% hydrogenated, and describes the use thereof as a substrate material for optical disks.

SUMMARY OF THE INVENTION

The present invention relates to a block copolymer which comprises at least three blocks, and which contains at least one hard block and at least one soft block, wherein the hard block contains at least 65, preferably 70, particularly 75, most preferably 80, most particularly 84% by weight of recurring units of general formula (I)

wherein $R^1$ and $R^2$ independently of each other, denote hydrogen or a $C_1$–$C_6$ alkyl, preferably a $C_1$–$C_4$ alkyl, $R^3$ represents hydrogen or a $C_1$–$C_6$ alkyl, preferably a $C_1$–$C_4$ alkyl, particularly methyl and/or ethyl, or an alkylene comprising a condensed-on ring, preferably a $C_3$ or $C_4$ alkylene (comprising a condensed-on 5- or 6-membered cycloaliphatic ring), p represents an integer of 0 or 1 to 5, preferably 0 or 1 to 3, and the soft block contains 99–50% by weight, preferably 95–70% by weight, of recurring units based on a straight chain or branched $C_2$–$C_{14}$ alkylene, preferably a $C_2$–$C_8$ alkylene, and 1–50% by weight, preferably 5–30% by weight, of recurring units of general formula (I).

DETAILED DESCRIPTION OF THE INVENTION

The recurring units in the soft block can be distributed randomly, alternately or in the form of a gradient.

The proportion of hard blocks (with respect to the total polymer) is generally 65 to 97% by weight, preferably 75 to 95% by weight, and the proportion of soft blocks is 3 to 35% by weight, preferably 5 to 25% by weight.

The recurring units corresponding to formula (I) in the hard and soft blocks can either be identical or different. In turn, a hard block and a soft block can themselves contain different recurring units which correspond to formula (I).

The hard blocks of the block copolymers according to the invention can contain up to 35% by weight at most of other recurring units, which are based on customary olefinic comonomers which are optionally substituted, and which preferably comprise cyclohexadiene, norbornene, dicyclopentadiene, dihydrocyclopentadiene, tetracyclododecene, vinyl esters, vinyl ethers, vinyl acetate, maleic acid derivatives and (meth)acrylic acid derivatives which are optionally substituted by a $C_1$–$C_4$ alkyl.

The block copolymer according to the invention can optionally contain other soft blocks comprising recurring units based on saturated aliphatic hydrocarbon chains which comprise 2 to 10, preferably 2 to 5 carbon atoms and which are optionally substituted by a $C_1$–$C_4$ alkyl group, and isomeric forms thereof.

The block copolymer according to the invention generally has a molecular weight (number average) of 5000–1,000, 000, preferably from 50,000–500,000, most preferably 80,000–200,000, as determined by gel permeation chromatography using a polystyrene calibration standard. The (number average) molecular weight of the hard blocks is generally 650–970,000, preferably 6500–480,000, most preferably 10,000–190,000. The molecular weight of the soft blocks is generally 150–350,000, preferably 1500–170,000, most preferably 2400–70,000. The block copolymer can contain hard and soft blocks which each have different molecular weights.

Apart from stereoregular head-to-tail linkages, the linking between the chain components can also comprise a small proportion of head-to-head linkages. The copolymers can be linear or can be branched via branching centres. They can also have a star-shaped structure. Linear block copolymer are preferred within the scope of the present invention.

The block copolymer according to the invention can comprise different block structures, wherein the terminal blocks, independently of each other, can constitute a hard or a soft block. They can be built up as follows, for example:

$A^1-(B^i-A^i)_n$;
$B^1-(A^i-B^i)_n$;
$(A^i-B^i)_n$;

wherein

A represents a hard block, B represents a soft block., $n \geq 1$, and preferably represents 1, 2, 3 or 4, and i represents an integer between 1 and n ($1 \leq i \leq n$).

The hard and soft blocks in the block copolymer according to the invention are generally incompatible with each other. This incompatibility results in phase separations on a microscopic scale.

On account of micro-phase separation phenomena, the block copolymer according to the invention exhibits more than one glass transition. The glass transition temperature of the hard phase, which predominantly consists of hard blocks, is at least 100° C., preferably at least 120° C., most preferably at least 140° C., as determined by differential thermal analysis. The glass transition temperature of the soft phase, which predominantly consists of soft blocks, ranges from –120° C. to 60° C., preferably –100° C. to 20° C., most preferably –80° C., to 0° C., as determined by dynamic mechanical analysis (DMA).

The present invention further relates to a process for producing block copolymers according to the invention, which is characterised in that aromatic vinyl monomers of general formula (II) for the hard blocks, as well as conjugated dienes of general formula (III) and aromatic vinyl monomers of general formula (II) for the soft blocks (II)

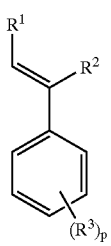

-continued (III)

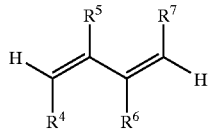

wherein
R$^1$, R$^2$, R$^3$ and p have the meanings given above, and
R$^4$ to R$^1$, independently of each other, denote hydrogen or a C$_1$–C$_4$ alkyl, preferably methyl,
are reacted in an active polymerisation process to form a prepolymer, and the carbon-carbon double bonds of the prepolymer are subsequently hydrogenated in the presence of a homogeneous or heterogeneous catalyst.

The monomers which correspond to formula (II) for the hard and soft blocks of the prepolymer can be either identical or different. A hard block and a soft block can contain different recurring units based on monomers of formula (II).

The following substances are preferably used as comonomers in the polymerisation and are also incorporated in the hard blocks: cyclohexadiene, vinylcyclohexane, vinylcyclohexene, norbornene, dicyclopentadiene, dihydrocyclopentadiene, tetracyclo-dodecene, styrenes comprising an alkylated nucleus, α-methylstyrene, divinylbenzene, vinyl esters, vinyl ethers, vinyl acetate, maleic acid derivatives and (meth)acrylic acid derivatives, etc., which are each optionally substituted by a C$_1$–C$_4$ alkyl, or a mixture thereof.

The present invention further relates to a prepolymer which comprises at least three blocks and which contains at least one hard block and at least one soft block,
wherein the hard block contains at least 65, preferably 70, more preferably 75, most preferably 80, particularly 84% by weight of recurring units of general formula (IV), (IV)

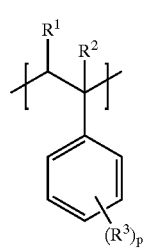

wherein
R$^1$, R$^3$, R$^3$ and p have the meanings given above,
and the soft block contains
99–50% by weight, preferably 95–70% by weight, of recurring units based on straight chain or branched, aliphatic (optionally olefinic) hydrocarbon chains which comprise 2 to 14, preferably 2 to 5, carbon atoms and which are optionally substituted by a C$_1$–C$_4$ alkenyl, and
1–50% by weight, preferably 5–30% by weight, of recurring units of general formula (IV).

The recurring units in the soft block can be distributed randomly, alternately or in the form of a gradient. The proportion of hard blocks is generally 65 to 97% by weight, preferably 75 to 95% by weight, and the proportion of soft blocks is 3 to 35% by weight, preferably 5 to 25% by weight.

The prepolymer can be produced by an active polymerisation process, such as an active anionic polymerisation or an active radical polymerisation process. Polymerisation methods such as these are generally known in polymer chemistry. An active anionic polymerisation process which can be initiated by alkali metals or by an alkali metal alkyl compound such as methyllithium or butyllithium is particularly suitable. Suitable solvents for polymerisation processes of this type are hydrocarbons, such as cyclohexane, hexane, pentane, benzene, toluene, etc., and ethers such as diethyl ether, methyl tert-butyl ether or tetrahydrofuran.

Different block structures can be obtained by an active polymerisation process. During anionic polymerisation in a hydrocarbon medium such as cyclohexane or benzene, no chain termination occurs, and no chain transfer occurs if active impurities such as water, oxygen, carbon dioxide, etc. are excluded. Block copolymers which comprise defined block segments can be produced by the sequential addition of monomers or mixtures of monomers. For example, a styrene-isoprene or styrene-butadiene diblock copolymer can be produced by adding the styrene monomer after polymerisation of the diene is complete. In the present invention, the chain structure is denoted by the symbol $(I)_m$—$(S)_n$ or $(B)_m$—$(S)_n$, or in simplified form by IS or BS, wherein m and n denote the degree of polymerisation in the respective blocks.

It is also known that block copolymers which comprise a mixed block (a "smeared block boundary") can be produced by making use of the favourable cross-polymerisation parameters and by initiating polymerisation in a mixture of monomers. Thus, for example, a styrene/butadiene diblock copolymer which comprises a diene-rich mixed block as soft block can be produced by initiating polymerisation in a mixture of styrene and butadiene in a hydrocarbon medium. The polymer chain contains a diene-rich soft block, a transition phase comprising an increasing degree of incorporation of styrene, and a styrene block which terminates the chain. The chain structure is denoted by the symbol $(I^{I/S})_m$—$(S)_n$ or $(B^{I/S})_n$—$(S)_n$, or in simplified form by $I^{I/S}S$ or $B^{BS}S$, wherein $I^{I/S}$ and $B^{BS}$ represent the isoprene-rich and the butadiene-rich soft blocks, respectively. The corresponding hydrogenated products are denoted as H—$I^{I/S}S$ or H—$B^{BS}S$.

By a combination of the two aforementioned procedures, multiblock copolymers can be produced which comprise both mixed blocks and defined soft blocks. Examples include triblock $SI^{I/S}S$, $I^{I/S}SI$, and pentablock $S(I^{I/S}S)_2$ and $(I^{I/S}S)_2I$. The symbols are self-explanatory. The corresponding hydrogenated products are denoted by H—$SI^{I/S}S$ or H—$I^{I/S}SSI$, or H—$S(I^{I/S}S)_2$ and H—$(I^{I/S}S)_2I$, respectively.

It is possible to control the molecular weight during anionic polymerisation by varying the monomer/initiator ratio. The theoretical molecular weight can be calculated from the following equation:

$$M = \frac{\text{Total weight of monomers (g)}}{\text{Quantitative amount of initiator (mol)}}$$

Other factors such as the solvent, co-solvent or co-catalyst can also exert a sensitive effect on the chain structure. In the present invention, hydrocarbons such as cyclohexane, toluene or benzene are preferred as solvents for the polymerisation process, since in solvents such as these a block copolymer which comprises mixed blocks can be formed and the diene monomer preferentially polymerises to form the highly-elastic 1,4-polydiene. A co-solvent which contains oxygen or nitrogen, such as tetrahydrofuran, dimethoxyethane or N,N,N',N'-tetramethyethylenediamine for example, results in random polymerisation and at the same time results in the 1,2-polymerisation of conjugated dienes occurring preferentially. In contrast thereto, an alkali metal alcoholate such as lithium tert-butylate also results in random polymerisation, but has little effect on the 1,2/1,4 ratio during diene polymerisation.

The microstructure of the soft blocks in the prepolymer determines the microstructure of the soft blocks in the corresponding hydrogenated block copolymer. Thus, for example, the hydrogenation of a poly-1,4-butadiene block results in a polyethylene segment which is capable of crystallising. The hydrogenation product of poly-1,2-butadiene has a glass transition temperature which is too high, and it is thus not elastic. The hydrogenation of a polybutadiene block which has a suitable 1,2/1,4 ratio can result in an elastic poly(ethylene-co-butylene) segment. When isoprene is used as a comonomer for the soft block, 1,4-polymerisation occurs preferentially, since an alternating poly(ethylene-propylene) elastomer block is formed by hydrogenation. As a rule, diene polymerisation proceeds non-specifically, and all possible isomeric microstructures are found in the soft block. In a hydrocarbon medium without a co-solvent, butadiene and isoprene predominantly polymerise to form a 1,4-microstructure (about 90%).

The temperature, pressure and monomer concentration are essentially non-critical for the polymerisation. The preferred temperature, pressure and monomer concentration for the polymerisation fall within the ranges from −60° C. to 130° C., most preferably 20° C. to 100° C. from 0.8 to 6 bar, and from 5 to 30% by weight (with respect to the sum of monomer and the amount of solvent).

The process according to the invention for producing block copolymers is optionally conducted with or without, preferably without, a workup stage for isolating the prepolymer between the polymerisation and hydrogenation stages. Workup, if employed, can be effected by known methods such as precipitation in a non-solvent such as a $C_1$–$C_4$ alcohol or a $C_3$–$C_6$ ketone, for example, or by extrusion with evaporation or by stripping, etc. In this case, the prepolymer is re-dissolved in a solvent for the hydrogenation stage. Without workup, the prepolymer solution can be hydrogenated directly, optionally after chain termination and optionally by employing the same inert solvent used in the polymerisation stage, or after dilution with another inert solvent. In the latter case, a saturated hydrocarbon, such as cyclohexane, hexane, or mixtures thereof, for example, is most preferred as a solvent for the process.

Hydrogenation of the prepolymers is effected by methods which are generally known (e.g. WO 94/02 720, WO 96/34 895, EP-A-322 731). There is a multiplicity of known hydrogenation catalysts which can be used as catalysts. Examples of preferred metal catalysts are given in WO 94/21 694 or WO 96/34 896. Any known catalyst for a hydrogenation reaction can be used as a catalyst. Catalysts with a large surface area (e.g. 100–600 m²/g) and a small average pore diameter (e.g. 20–500 Å) are suitable. Catalysts with a small surface area (e.g. >10 m²/g) and large average pore diameters are also suitable if they are characterised in that 98% of the pore volume comprises pores with pore diameters larger than 600 Å (e.g. about 1000–4000 Å) (see: U.S. Pat. No. 5,654,253, U.S. Pat. No. 5,612,422 or JP-A 03076706 for example). Raney nickel, nickel on silica or silica/alumina, nickel on carbon as a support, and noble metal catalysts, e.g. Pt, Ru, Rh or Pd, are used in particular.

Hydrogenation is generally conducted at temperatures between 0 and 500° C., preferably between 20 and 250° C., particularly between 60 and 200° C.

The solvents which are customarily used for hydrogenation reactions are described in DE-AS 1 131 885, for example.

The reaction is generally conducted at pressures of 1 bar to 1000 bar, preferably 20 to 300 bar, particularly 40 to 200 bar.

The process generally results in practically complete hydrogenation of the aromatic units and possibly of the double bonds in the main chain. The degree of hydrogenation is generally higher than 97%, most preferably higher than 99.5%. The degree of hydrogenation can be determined by NMR or UV spectroscopy, for example.

The amount of catalyst used depends on the procedure employed. The process can be conducted continuously, semi-continuously or batch-wise.

In a batch process, the ratio of catalyst to prepolymer generally falls within the range from 0.3–0.001, preferably 0.2–0.005, most preferably 0.15–0.01.

At room temperature, the block copolymers according to the invention exhibit an amorphous morphology with separation of microphases, and are distinguished by their high transparency, high toughness, low birefiingence and high resistance to thermal deformation. On account of their good flowability in the melt, they can be thermoplastically processed by extrusion or injection moulding to form sheets or any desired mouldings, and can also be cast to form films.

On account of their outstanding optical properties, the polymers according to the invention are particularly suitable for the production of optical materials, e.g. for lenses, prisms, mirrors, colour filters, etc., and are also suitable as media for holographic images (e.g. for cheque cards, credit cards, passes, and for three-dimensional holographic images). The materials can be used as transparent media on which three-dimensional structures can be inscribed, e.g. three-dimensional structures from focused coherent radiation (LASER), and can be used in particular as three-dimensional data storage media or for the three-dimensional imaging of objects.

The material can normally be used instead of or in combination with glass, up to temperatures of use of 140° C. External uses for these transparent materials include roof coverings, window glass, sheeting, or for the glazing of greenhouses in the form of double-ribbed sheeting for example. Other applications include coverings, which are also highly transparent, for the protection of mechanically sensitive systems, e.g. in the sphere of photovoltaics, particularly solar cells or solar collectors. The plastics according to the invention can be coated with other materials, particularly with nanoparticles in order to enhance the scratch-resistance thereof, and with metals or other polymers.

Examples of domestic applications include transparent packaging materials which exhibit a reduced permeability to water, domestic articles e.g. beakers and containers, and also housings for domestic appliances and transparent lamp covers.

The plastics can be used as temperature-resistant rigid foams for insulation in the building and engineering sectors (for the insulation of houses and for the insulation of appliances, e.g. refrigerators), and can replace polystyrene and polyurethane foam. One advantage is their high temperature of continuous use.

Due to their low density (d<1) and the saving in weight which results therefrom, the materials are particularly suitable for applications in the automobile, aviation and space travel industries for instrument panels, transparent covers for instrument systems and for light sources, for vehicle glazing and as an insulation material.

The materials are insulators for electric current and are therefore suitable for the production of capacitors (e.g. dielectrics), electronic circuits and device housings. Other applications in the electronics industry arise in particular from their combination of high optical transparency, high resistance to thermal deformation, and low water absorption in association with light from suitable light-emitting sources. The materials are therefore suitable for the production of light-emitting diodes, laser diodes, matrices for organic, inorganic and polymeric electroluminescent materials, optoelectronic signal recording devices, the replacement of glass fibres in data transmission systems (e.g. polymeric optical waveguides), and transparent materials for electronic display media (VDU screens, displays, projection apparatuses) on liquid crystalline substrates, for example.

The materials are suitable for applications in medical technology, e.g. for transparent extruded or injection moulded articles for sterile and non-sterile analysis vessels, Petri dishes, microfilter plates, object supports, flexible tubing, respiratory tubing, contact lenses and containers for infusion solutions or solution of medicines, for example, for extrude and injection moulded articles for applications in contact with blood, particularly for the production of syringes, cannulas, catheter, short- and long-term implants (e.g. artificial lenses), blood tubing, membranes for the washing of blood, dialysis apparatuses, oxygenators, transparent coverings for wounds, blood containers and stitching materials.

The block copolymers according to the invention are particularly suitable as a substrate material for optical data storage media such as compact discs, video discs, rewritable optical discs, and magneto-optical discs.

Examples of optical data storage media include:

magneto-optical disc (MO disc)

mini-disc (MD)

ASMO (MO-7) ("advanced storage magneto-optic")

DVR (12 Gbyte disc)

MAMMOS ("magnetic amplifying magneto-optical system")

SIL and MSR ("solid immersion lens" and "magnetic super-resolution")

CD-ROM (read only memory)

CD, CD-R (recordable), CD-RW (rewritable), CD-I (interactive), photo–CD super audio CD DVD, DVD-R (recordable), DVD-RAM (random access memory);

DVD digital versatile disc

DVD-RW (rewritable)

PC+RW (phase change and rewritable)

MMVF (multimedia video file system)

Transparent plastics such as aromatic polycarbonates, polymethyl methacrylate or polystyrene can be used as substrates for optical data storage media. However, none of these commonly used substrate materials can be employed without restrictions for very high density data storage media (>10 Gbyte per pit layer of 120 mm diameter). Very low birefringence and water absorption, high resistance to thermal deformation and flowability and satisfactory mechanical properties are necessary simultaneously for this purpose. Aromatic polycarbonates do in fact exhibit very good mechanical properties and resistance to thermal deformation, but have a birefringence and a water absorption which are too high. Polystyrene has a birefringence which is too high and a resistance to thermal deformation which is too low. Polymethyl methacrylate has a water absorption which is too high and a resistance to thermal deformation which is too low.

Birefringence in injection mouldings, which is one of the most important optical properties thereof, can be described on a molecular level by the rheooptical constant. The rheooptical constant can be either positive or negative. The higher is the absolute value of the rheooptical constant, the higher is the birefringence of injection moulded parts. Depending on the chain structure and composition, the rheooptical constant CR which has been determined on the material according to the invention ranges between −0.3 GPa$^{-1}$ and 0.3 GPa$^{-1}$. The magnitude thereof is less than that for polycarbonate (5.4 GPa$^{-1}$) by more than a factor of ten. The procedure for measuring the rheooptical constant is described in EP-A 0 621 2–97. The plane parallel 150 to 1000 μm specimen which is necessary for this purpose can be produced by pressing from a melt or by casting a film. Compared to polycarbonate, the material can be considered to be free from birefringence. It has a high resistance to thermal deformation, a very low water absorption and good mechanical properties, and is therefore an ideal material for very high density data storage media (>10 Gbyte on a disc of diameter 120 mm).

In order to improve the material and the processing properties thereof, various additives (such as antioxidants, demoulding agents for example) or colorants can be admixed with the block copolymers according to the invention. These additives can also be used as co-constituents of blends or as compatibility-imparting agents in a blend system. Examples of suitable blend co-constituents include polyvinyl-cyclohexane, polycycloolefines based on norbomene or tetracyclododecene, polystyrene, polycarbonate, polyesters, polyacrylates, polyvinyl acetate, polyethylene, polypropylene and various elastomers.

The block copolymers according to the invention can also be used as mixtures with one another.

EXAMPLES

Example 1

1040 g of dry cyclohexane and 76.5 g of dry styrene were placed, with the exclusion of air and water and with a blanket of dry nitrogen over the batch, in a temperature-controlled 2 liter glass autoclave fitted with a stirrer and a temperature sensor. The contents of the autoclave were rendered inert by repeated pressurisation with nitrogen. After heating to 50° C., 0.9 ml (1.44 mmol) n-butyl lithium (1.6 M solution in hexane) was injected in. The internal temperature was raised to 70° C. and the batch was stirred for a further 1 hour.

A mixture of 27 g dry isoprene and 76.5 g dry styrene was then added, followed by stirring for 3 hours. After cooling to room temperature, the viscous solution was transferred to another vessel which had been rendered inert with nitrogen and the polymerisation was terminated by adding a little isopropanol. The conversion was quantitative, as determined by measuring the solids content. Structural data are listed in Table 1.

Example 2

The procedure was as in Example 1, except that 81 g styrene, 18 g isoprene and 81 g styrene were used in the corresponding operating stages. The conversion was quantitative, as determined by measuring the solids content. Structural data are listed in Table 1.

Example 3

The procedure was as in Example 1, except that 85.5 g styrene, 9 g isoprene and 85.5 g styrene were used in the corresponding operating stages. The conversion was quantitative as determined by measuring the solids content. Structural data are listed in Table 1.

TABLE 1

Triblock prepolymers comprising hard terminal groups

| Example | Structural description | Styrene content | Isoprene content | Conversion |
|---|---|---|---|---|
| 1 | SI$^{IS}$S | 85% by weight | 15% by weight | >98% |
| 2 | SI$^{IS}$S | 0% by weight | 10% by weight | >98% |
| 3 | SI$^{IS}$S | 95% by weight | 5% by weight | >98% |

Example 4

1040 g of dry cyclohexane, 9 g of dry isoprene and 162 g of dry styrene were placed, with the exclusion of air and water and with a blanket of dry nitrogen over the batch, in a temperature-controlled 2 liter glass autoclave fitted with a stirrer and a temperature sensor. The contents of the autoclave were rendered inert by repeated pressurisation with nitrogen. After heating to 50° C., 0.9 ml (1.44 mmol) n-butyl lithium (1.6 M solution in hexane) was injected in. The internal temperature was raised to 70° C. and the batch was stirred for a firther 1 hour.

A mixture of 9 g dry isoprene was then added thereto, followed by stirring for 3 hours. After cooling to room temperature, the viscous solution was transferred to another vessel which had been rendered inert with nitrogen and the polymerisation was terminated by adding a little isopropanol. The conversion was quantitative, as determined by measuring the solids content. Structural data are listed in Table 2.

Example 5

1040 g of dry cyclohexane and 54 g of dry styrene were placed, with the exclusion of air and water with the exclusion of air and water and with a blanket of dry nitrogen over the batch, in a temperature-controlled 2 liter glass autoclave fitted with a stirrer and a temperature sensor. The contents of the autoclave were rendered inert by repeated pressurisation with nitrogen. After heating to 50° C., 0.9 ml (1.44 mmol) n-butyl lithium (1.6 M solution in hexane) was injected in. The internal temperature was raised to 70° C. and the batch was stirred for a further 1 hour.

A mixture of 9 g of dry isoprene and 54 g of dry styrene was then added, followed by stirring for 1 hour.

Finally, a mixture of 9 g dry isoprene and 54 g dry isoprene was again added, and the batch was stirred for a further 3 hours. After cooling to room temperature, the viscous solution was transferred to another vessel which had been rendered inert with nitrogen and the polymerisation was terminated by adding a little isopropanol. The conversion was quantitative, as determined by measuring the solids content. Structural data are listed in Table 2.

Example 6

1040 g of dry cyclohexane, 9 g of dry isoprene and 76.5 g of dry styrene were placed, with the exclusion of air and water and with a blanket of dry nitrogen over the batch, in a temperature-controlled 2 liter glass autoclave fitted with a stirrer and a temperature sensor. The contents of the autoclave were rendered inert by repeated pressurisation with nitrogen. After heating to 50° C., 0.9 ml (1.44 mmol) n-butyl lithium (1.6 M solution in hexane) was injected in. The internal temperature was raised to 70° C. and the batch was stirred for a further 1 hour.

A mixture of 9 g of dry isoprene and 76.5 g of dry styrene was then added, followed by stirring for 1 hour.

Finally, 9 g dry isoprene was again added, and the batch was stirred for a further 3 hours. After cooling to room temperature, the viscous solution was transferred to another vessel which had been rendered inert with nitrogen and the polymerisation was terminated by adding a little isopropanol. The conversion was quantitative, as determined by measuring the solids content. Structural data are listed in Table 2.

TABLE 2

Pentablock prepolymers comprising hard or soft terminal groups

| Example | Structural description | Styrene content | Isoprene content | Conversion |
|---|---|---|---|---|
| 4 | $I^{IS}SI$ | 90% by weight | 10% by weight | >98% |
| 5 | $S(I^{IS}S)_2$ | 90% by weight | 10% by weight | >98% |
| 6 | $(I^{IS}S)_2I$ | 85% by weight | 15% by weight | >98% |

Example 7

A 5 liter steel autoclave was flushed with nitrogen. The polymer solution from Example 1 and 22.5 g nickel on silica gel/alumina ($Ni/Al_2O_3.SiO_2$, Ni 64–67%, reduced) were added. After the autoclave had been closed, it was repeatedly acted upon by nitrogen, and then by hydrogen. After depressurisation, the hydrogen pressure was adjusted to 140 bar and the batch was heated for 6 hours at 175° C. with stirring.

After the reaction was complete, the polymer solution was filtered. The product was precipitated in acetone and dried at 120° C. The yield was 94%. Neither aromatic nor olefinic carbon-carbon double bonds could be detected by 1 H NMR spectroscopy.

Test bars for tensile testing experiments were produced in an Arburg injection moulding machine (ARB. 270-200-18 mm) at a melt temperature of 230° C. and a mould temperature of 40° C. The product had the physical properties listed in Table 3.

Example 8–Example 12

The procedure was as in Example 7. The polymer solutions from Example 2 to Example 6 were used in each case. Neither aromatic nor olefinic carbon-carbon double bonds could be detected in the hydrogenation products by 1 H NMR spectroscopy. The test data are given in Table 3.

Comparative Example 1

1040 g of dry cyclohexane, 45 g of dry isoprene and 135 g of dry styrene were placed, with the exclusion of air and water and a blanket of dry nitrogen over the batch, in a temperature-controlled 2 liter glass autoclave fitted with a stirrer and a temperature sensor. The contents of the autoclave were rendered inert by repeated pressurisation with nitrogen. After heating to 50° C., 0.9 ml (1.44 mmol) n-butyl lithium (1.6 M solution in hexane) was injected in. The internal temperature was raised to 70° C. and the batch was stirred for a further 3 hours. After cooling to room temperature, the viscous solution was transferred to another vessel which had been rendered inert with nitrogen and the polymerisation was terminated by adding a little isopropanol. The conversion was quantitative, as determined by measuring the solids content.

The resulting polymer solution was completely hydrogenated, analogously to the procedure described in Example 7. The hydrogenation product was worked up analogously and was injection moulded to form test bars. The test data are given in Table 4.

Comparative Example 2

The procedure was as in comparative example 1, except that 27 g isoprene and 153 g styrene were used in the corresponding operating stages. The test data are given in Table 4.

Comparative Example 3

1040 g of dry cyclohexane and 67.5 g of dry styrene were placed, wvith the exclusion of air and water and with a blanket of dry nitrogen over the batch, in a temperature-controlled 2 liter glass autoclave fitted with a stirrer and a temperature sensor. The contents of the autoclave were rendered inert by repeated pressurisation with nitrogen. After heating to 50° C., 1.6 ml (2.56 mmol) n-butyl lithium (1.6 M solution in hexane) was injected in. The internal temperature was raised to 70° C. and the batch was stirred for a further 1 hour. 45 g of dry butadiene was then added, and the batch was stirred for a further 1 hour. Finally, 67.5 g of dry styrene were added, followed by stirring for a further 3 hours. After cooling to room temperature, the viscous solution was transferred to another vessel which had been rendered inert with nitrogen and the polymerisation was terminated by adding a little isopropanol. The conversion was quantitative, as determined by measuring the solids content.

The resulting polymer solution was completely hydrogenated, analogously to the procedure described in Example 7. The product was precipitated in acetone and dried at 120° C. Neither aromatic nor olefinic carbon-carbon double bonds could be detected by 1H NMR spectroscopy. The product had the physical properties listed in Table 4.

Comparative Example 4

Test bars for tensile testing experiments of polystyrol PS158K (BASF AG, Ludwigshaten, Germany) were produced in an Arburg injection moulding machine (ARB. 270-200-18 mm) at a melt temperature of 230° C. and a mould temperature of 40° C. The product had the physical properties listed in Table 4.

TABLE 3

Examples 7–12

| Example | Structural symbol | Yield | $T_g$ (DSC, °C.) | Tg (DMA, °C.)[1] | G'(GPa)[2] | Tensile strength (MPa)[6] | $\epsilon_b$ (RT)[3] | $C_R$ (GPa$^{-1}$)[4] | Haze[5] |
|---|---|---|---|---|---|---|---|---|---|
| 7 | H-SI$^{IS}$S (85% S) | 94% | 143.4 | −36/132 | 0.78 | 42.3 | 6.7% | <0.05 | 4.9% |
| 8 | H-SI$^{IS}$S (90% S) | 97% | 141.0 | −7/124 | 1.005 | 49.5 | 4.4% | <0.05 | 3.9% |
| 9 | H-SI$^{IS}$S (95% S) | >98% | 131.6 | —/125 | 1.225 | 45.4 | 3.23% | −0.13 | 8.3% |
| 10 | H-I$^{IS}$SI (90% S) | >98% | 146.4 | 23/132 | 1.025 | 50.3 | 4.1% | <0.05 | 8.6% |
| 11 | H-S(I$^{IS}$S)$_2$ (90% S) | 87% | 124.0 | —/105 | 0.995 | 46.5 | 3.5% | −0.18 | 3.8% |
| 12 | H-(I$^{IS}$S)$_2$I (85% S) | >98% | 129.9 | —/105 | 0.93 | 47.0 | 5.0% | 0.12 | 1.6–3.2% |

[1] The two $T_g$ values (DMA) corresponded to the glass transitions of the dispersed hard phase and of the continuous soft phase
[2] Modulus of resilience at room temperature (DMA)
[3] Elongation at break at room temperature (tensile test on 3 mm bars with shoulders, at room temperature, measured according to DIN 53 455 at a main transverse velocity of 5 mm/min)
[4] Rheooptical constant (measured according to the information in EP-A 621 297)
[5] Measured according to ASTM D 1003 on a 3 mm bar with a shoulder
[6] Measured according to DIN 53 455 at a main transverse velocity of 5 mm/min

TABLE 4

Examples 1–4

| Example | Structural symbol | Yield | Tg (DSC, °C.) | Tg (DMA, °C.)[1] | G'(GPa)[2] | Tensile strength (MPa)[6] | $\epsilon_b$ (RT)[3] | $C_R$ (GPa$^{-1}$)[4] | Haze[5] |
|---|---|---|---|---|---|---|---|---|---|
| 7 | H-SI$^{IS}$S (75% S) | >94% | 137.6 | −22/135 | 0.33 | 31 | 13% | −0.08 | 29% |
| 2 | H-SI$^{IS}$S (85% S) | 96% | 138.9 | −10/135 | 0.71 | 36 | 3% | −0.05~0.05 | 11% |
| 3 | H-SBS (75% S) | 80% | (part crystalline TM 86~86)° | — | — | — | — | — | (hazy) |
| 4 | polystyrene[7] | — | 100 | 106 | 1.425 | 52.5 | 2.1% | −4.5 | 4% |

[1] The two $T_g$ values (DMA) corresponded to the glass transitions of the dispersed hard phase and of the continuous soft phase
[2] Modulus of resilience at room temperature (DMA)
[3] Elongation at break at room temperature (tensile test on 3 mm bars with shoulders, at room temperature, measured according to DIN 53 455 at a main transverse velocity of 5 mm/min)
[4] Rheooptical constant (measured according to the information in EP-A 621 297)
[5] Measured according to ASTM D 1003 on a 3 mm bar with a shoulder
[6] Measured according to DIN 53 455 at a main transverse velocity of 5 mm/min
[7] Polystyrene: Polystyrol 158 K, BASF AG, Ludwigshafen, Germany

What is claimed is:

1. A block copolymer which comprises at least three blocks and which contains at least one hard block and at least one soft block, wherein the hard block contains at least 65% by weight of recurring units of general formula (I)

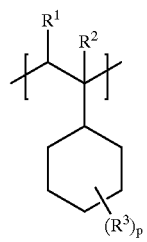

(I)

wherein
$R^1$ and $R^2$, independently of each other, denote hydrogen or a $C_1$–$C_6$ alkyl,
$R^3$ represents hydrogen or a $C_1$–$C_6$ alkyl or an alkylene comprising a condensed-on ring,
p represents an integer of 0 or 1 to 5,
and the soft block contains
99–50% by weight of recurring units based on a straight chain or branched $C_2$–$C_{14}$ alkylene, and
1–50% by weight of recurring units of general formula (I).

2. A block copolymer according to claim 1, wherein the hard block contains at least 70% by weight of recurring units of formula (I).

3. A block copolymer according to claim 1, wherein the hard block at least 75% by weight of recurring units of formula (I).

4. A block copolymer according to claim 1, wherein the hard block contains at least 80% by weight of recurring units of formula (I).

5. A block copolymer according to claim 1, wherein the hard block contains at least 84% by weight of recurring units of formula (I).

6. A block copolymer according to claim 1, wherein the soft block contains 95 to 70% by weight of recurring units based on a straight chain or branched $C_2$–$C_{14}$ alkylene and 5 to 30% by weight of recurring units of general formula (I).

7. A block copolymer according to claim 1, wherein the proportion of hard blocks, with respect to the total polymer is 65 to 97% by weight and the proportion of soft blocks is 3 to 35% by weight.

8. A block copolymer according to claim 1, having the following block structure $A^1$–$(B^i$–$A^i)_n$;
$B^1$–$(A^i$–$B^i)_n$;
$(A^i$–$B^i)_n$;

wherein
A represents a hard block, B represents a soft block., n≧1, and i represents an integer between 1 and n (1≦i≦n).

9. A process for producing the block copolymer of claim 1 comprising reacting aromatic vinyl monomers of formula (II) for the hard blocks, conjugated dienes of general formula (III) and aromatic vinyl monomers of formula (II) for the soft blocks in an active polymerization process to form a prepolymer and hydrogenating the carbon-carbon double bonds of the prepolymer in the presence of a homogeneous or heterogeneous catalyst, wherein said formula (II) conforms to

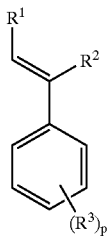
(II)

and said formula (III) conforms to

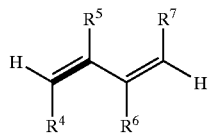
(III)

wherein $R^4$, $R^5$, $R^6$ and $R^7$ independently denote hydrogen or $C_{1-4}$-alkyl.

10. Optical data storage media comprising the block copolymer of claim 1.

11. A method of preparing a block copolymer comprising at least three blocks and which contains at least one hard block and at least one soft block, said hard block containing at least 65% by weight of recurring units of general formula (I),

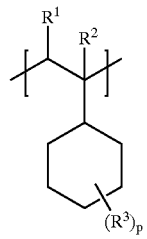
(I)

wherein $R^1$ and $R^2$, independently of each other, denote hydrogen or a $C_1$–$C_6$ alkyl, $R^3$ represents hydrogen or a $C_1$–$C_6$ alkyl or an alkylene comprising a condensed-on ring, p represents an integer of 0 or 1 to 5, and the soft block contains 99–50% by weight of recurring units based on a straight chain or branched $C_2$–$C_{14}$ alkylene, and 1–50% by weight of recurring units of general formula (I), said method comprising, (i) providing a prepolymer comprising at least three blocks that contains, (a) at least one hard block that Includes at least 65% by weight of recurring units of formula (IV),

(IV)

wherein $R^1$, $R^2$, $R^3$ and p are as defined in frrnmula (I), and (b) at least one soft block containing 99–50% by weight of recurring units based on straight chain or branched $C_{2-14}$ allphatic hydrocarbon chains, and 1–50% by weight of recurring units of formula (IV), and (ii) hydrogenating the carbon-carbon double bonds of said prepolymer in the presence of one of a homogenous catalyst and a heterogeneous catalyst.

12. A method of preparing a molding comprising one of extruding and injection molding a composition comprising the block copolymer of claim 1.

13. A method of preparing a molding comprising one of extruding and injection molding a composition comprising the block copolymer prepared by the method of claim 11.

* * * * *